(12) United States Patent
Kramer et al.

(10) Patent No.: US 12,163,466 B2
(45) Date of Patent: Dec. 10, 2024

(54) INJECTING STEAM INTO HOOD CAVITY OF TURBINE ENGINE COMBUSTOR

(71) Applicant: Raytheon Technologies Corporation, Farmington, CT (US)

(72) Inventors: Stephen K. Kramer, Cromwell, CT (US); Zhongtao Dai, West Hartford, CT (US); Lance L. Smith, West Hartford, CT (US); Gregory Boardman, Owens Cross Roads, AL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/121,442

(22) Filed: Mar. 14, 2023

(65) Prior Publication Data

US 2024/0309809 A1 Sep. 19, 2024

(51) Int. Cl.
    *F02C 3/30* (2006.01)

(52) U.S. Cl.
    CPC ............ *F02C 3/30* (2013.01); *F05D 2220/32* (2013.01); *F05D 2240/35* (2013.01); *F05D 2270/08* (2013.01)

(58) Field of Classification Search
    CPC .... F02C 3/30; F05D 2220/32; F05D 2240/35; F05D 2270/08
    See application file for complete search history.

(56) References Cited

U.S. PATENT DOCUMENTS

| | | | | |
|---|---|---|---|---|
| 4,327,547 A | * | 5/1982 | Hughes | F23D 17/002 60/39.463 |
| 4,425,755 A | * | 1/1984 | Hughes | F23D 17/002 60/742 |
| 4,955,191 A | | 9/1990 | Okamoto | |
| 5,054,279 A | * | 10/1991 | Hines | F01K 21/047 60/39.5 |

(Continued)

FOREIGN PATENT DOCUMENTS

| | | | | |
|---|---|---|---|---|
| DE | 19520292 A1 | 12/1996 | | |
| GB | 2187273 B | 1/1990 | | |
| GB | 2228295 A | * | 8/1990 | F02C 3/30 |

OTHER PUBLICATIONS

EP Search Report for EP Patent Application No. 24163647.1 dated Jul. 25, 2024.

*Primary Examiner* — David P. Olynick
(74) *Attorney, Agent, or Firm* — Getz Balich LLC

(57) ABSTRACT

An assembly is provided for a turbine engine. This assembly includes a housing, a combustor and a fuel injector assembly. The housing includes a case and a diffuser plenum radially within the case. The case extends axially along and circumferentially about a centerline. The combustor is disposed within the diffuser plenum. The combustor includes a bulkhead, a hood, a combustion chamber and a hood cavity. The bulkhead is axially between the combustion chamber and the hood cavity. The hood is between the hood cavity and the diffuser plenum. The fuel injector assembly projects radially into the diffuser plenum from the case. The fuel injector assembly includes a fuel nozzle and a steam nozzle.

(Continued)

The fuel nozzle is configured to inject fuel into the combustion chamber. The steam nozzle is configured to inject steam into the hood cavity.

17 Claims, 15 Drawing Sheets

(56) References Cited

U.S. PATENT DOCUMENTS

| | | | |
|---|---|---|---|
| 5,423,173 A * | 6/1995 | Lemon | F23L 7/00 60/776 |
| 6,311,471 B1 | 11/2001 | Waldherr | |
| 7,520,134 B2 * | 4/2009 | Durbin | F23L 7/005 60/742 |
| RE43,252 E | 3/2012 | Ginter | |
| 8,813,473 B2 | 8/2014 | Fletcher | |
| 2008/0078180 A1 | 4/2008 | Durbin | |
| 2010/0011771 A1 * | 1/2010 | Evulet | F23R 3/286 60/776 |
| 2011/0185699 A1 * | 8/2011 | Danis | F23R 3/50 60/39.55 |
| 2013/0055698 A1 | 3/2013 | Fletcher | |
| 2019/0032919 A1 | 1/2019 | Okada | |

\* cited by examiner

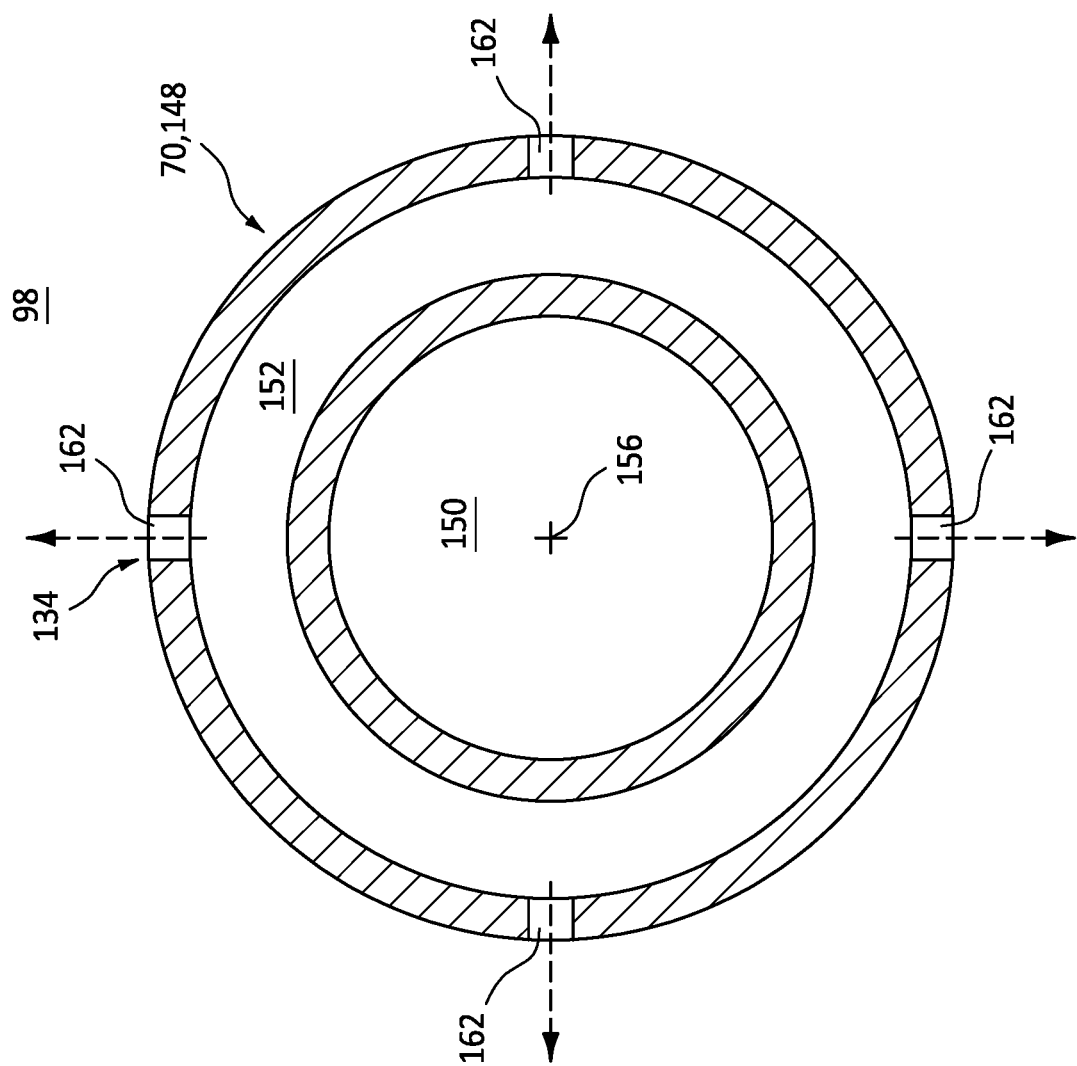

INJECTING STEAM INTO HOOD CAVITY OF TURBINE ENGINE COMBUSTOR

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, an assembly is provided for a turbine engine. This assembly includes a housing, a combustor and a fuel injector assembly. The housing includes a case and a diffuser plenum radially within the case. The case extends axially along and circumferentially about a centerline. The combustor is disposed within the diffuser plenum. The combustor includes a bulkhead, a hood, a combustion chamber and a hood cavity. The bulkhead is axially between the combustion chamber and the hood cavity. The hood is between the hood cavity and the diffuser plenum. The fuel injector assembly projects radially into the diffuser plenum from the case. The fuel injector assembly includes a fuel nozzle and a steam nozzle. The fuel nozzle is configured to inject fuel into the combustion chamber. The steam nozzle is configured to inject steam into the hood cavity.

According to another aspect of the present disclosure, another assembly is provided for a turbine engine. This assembly includes a housing, a combustor and a fuel injector assembly. The housing includes a diffuser plenum. The combustor is disposed within the diffuser plenum. The combustor includes a bulkhead, a hood, a combustion chamber and a hood cavity. The bulkhead is between the combustion chamber and the hood cavity. The hood is between the hood cavity and the diffuser plenum. A port in the hood fluidly couples the diffuser plenum to the hood cavity. The fuel injector assembly projects longitudinally along a centerline through the port and into the hood cavity. The fuel injector assembly is spaced from the hood at the port by an annular gap. The fuel injector assembly includes a fuel nozzle and a steam nozzle. The fuel nozzle is arranged longitudinally along the centerline between the steam nozzle and the combustion chamber. The fuel nozzle is configured to direct fuel into the combustion chamber. The steam nozzle includes a plurality of steam outlets arranged circumferentially about the centerline. Each of the steam outlets is configured to direct a flow of steam into the hood cavity.

According to still another aspect of the present disclosure, another assembly is provided for a turbine engine. This assembly includes an injector stem, a fuel nozzle and a steam nozzle. The injector stem includes a fuel passage and a steam passage. The fuel nozzle is connected to and cantilevered from the injector stem. The fuel nozzle is configured to inject fuel received from the fuel passage. The steam nozzle is connected to and cantilevered from the injector stem. The steam nozzle is configured to inject steam received from the steam passage. The steam nozzle is spaced from the fuel nozzle along the injector stem.

Each of the steam outlets may also be configured to direct the flow of steam into a flow of air directed from the diffuser plenum into the hood cavity through the annular gap.

The fuel injector assembly may also include an injector stem and an injector nozzle. The injector stem may be connected to and project radially inward from the case. The injector nozzle may be cantilevered from the injector stem. The injector nozzle may include the fuel nozzle and the steam nozzle.

The injector nozzle may project out from the injector stem and into the hood cavity.

The fuel nozzle and the steam nozzle may be disposed within the hood cavity.

The injector nozzle may project longitudinally out from the injector stem along a longitudinal centerline to a tip of the injector nozzle. The fuel nozzle may be arranged at the tip of the injector nozzle. The steam nozzle may be arranged longitudinally along the longitudinal centerline between the injector stem and the fuel nozzle.

The steam nozzle may be disposed adjacent the injector stem.

The steam nozzle may be longitudinally spaced from the injector stem.

The steam nozzle may be a first steam nozzle, and the fuel injector assembly may also include a second steam nozzle arranged longitudinally along the longitudinal centerline between the injector stem and the first steam nozzle.

The steam nozzle may include a plurality of steam outlets arranged circumferentially about a longitudinal centerline in an array.

A first of the steam outlets may be configured to direct a flow of the steam into the hood cavity along a trajectory with a radial component.

A first of the steam outlets may be configured to direct a flow of the steam into the cavity along a trajectory with an axial component.

The assembly may also include a steam swirler configured to swirl the steam directed into the hood cavity.

The assembly may also include an air swirler configured to swirl air flowing into the hood cavity from the diffuser plenum.

The fuel injector assembly may also include an injector stem. The injector stem may be connected to and project radially inward from the case. The fuel nozzle and the steam nozzle may each be cantilevered from the injector stem. The steam nozzle may be arranged radially along the injector stem between the fuel nozzle and the case.

The bulkhead may include a cooling circuit fluidly coupled with and between the hood cavity and the combustion chamber. The cooling circuit may be configured to direct the steam from the hood cavity, across the bulkhead, and into the combustion chamber.

The fuel injector assembly may also include an air swirler structure. The fuel nozzle may be configured to inject the fuel into the combustion chamber through the air swirler structure. The air swirler structure may be configured to direct swirled fluid into the combustion chamber with the fuel. The swirled fluid may include compressed air.

The swirled fluid may also include the steam.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 9 is a cross-sectional illustration through the fuel injector at the steam nozzle.

DETAILED DESCRIPTION

Figure 1:
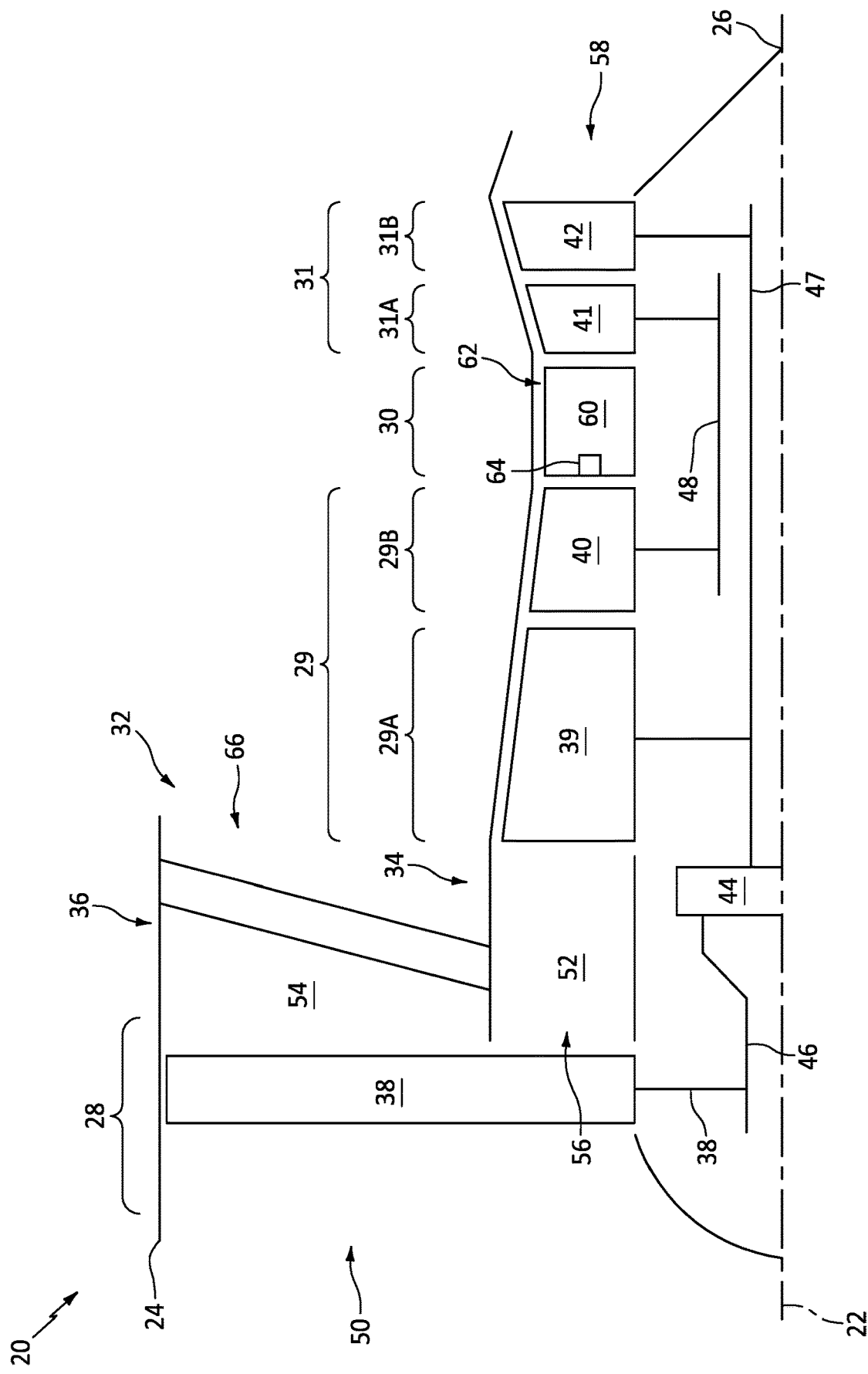
FIG. 1 is a partial schematic illustration of a gas turbine engine.

FIG. 1 is a side sectional illustration of a gas turbine engine 20 for an aircraft propulsion system. This turbine engine 20 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32. This engine housing 32 includes an inner case 34 (e.g., a core case) and an outer case 36 (e.g., a fan case). The inner case 34 may house one or more of the engine sections 29A-31B; e.g., a core of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core. The air within the bypass flowpath 54 may be referred to as "bypass air".

The core air is compressed by the LPC rotor 39 and the HPC rotor 40 and directed into a (e.g., annular) combustion chamber 60 of a (e.g., annular) combustor 62 in the combustor section 30. Fuel is injected by one or more fuel injector assemblies 64 (one visible in FIG. 1) into the combustion chamber 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 66 from the bypass flowpath 54. The propulsion of the bypass air may account for a majority of thrust generated by the turbine engine 20.

Figure 2:
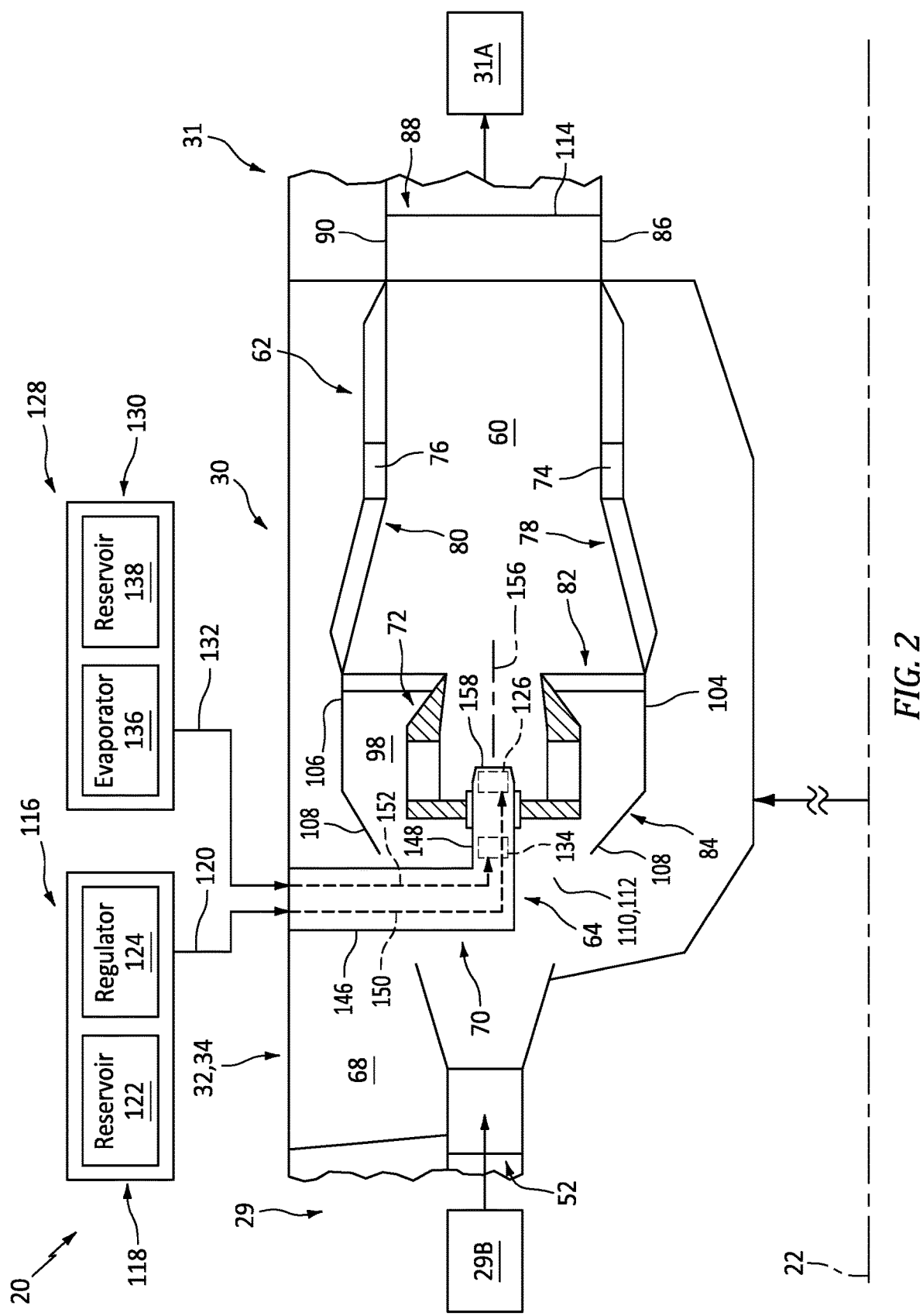
FIG. 2 is a partial schematic illustration of a combustor section between a compressor section and a turbine section.

FIG. 2 illustrate a portion of the combustor section 30 along the core flowpath 52 between the HPC section 29B and the HPT section 31A. This combustor section 30 includes the combustor 62, a diffuser plenum 68 and the one or more injector assemblies 64 (one visible in FIG. 2). Briefly, the combustor 62 is disposed within (e.g., surrounded by) the diffuser plenum 68. This diffuser plenum 68 receives the compressed core air from the HPC section 29B for subsequent provision into the combustion chamber 60. Each injector assembly 64 of FIG. 2 includes a fuel injector 70 mated with an air swirler structure 72. The fuel injector 70 injects the fuel into the combustion chamber 60. The air swirler structure 72 directs some of the core air from the diffuser plenum 68 into the combustion chamber 60 in a manner that facilitates mixing the core air with the injected fuel. One or more igniters (not shown) ignite the fuel-air mixture within the combustion chamber 60. One or more quench apertures 74, 76 (e.g., dilution holes) in each wall 78, 80 of the combustor 62 direct additional core air from the diffuser plenum 68 into the combustion chamber 60 to facilitate complete burnout of (e.g., make stoichiometrically lean) the combustion products; e.g., the ignited fuel-air mixture.

Figure 3:
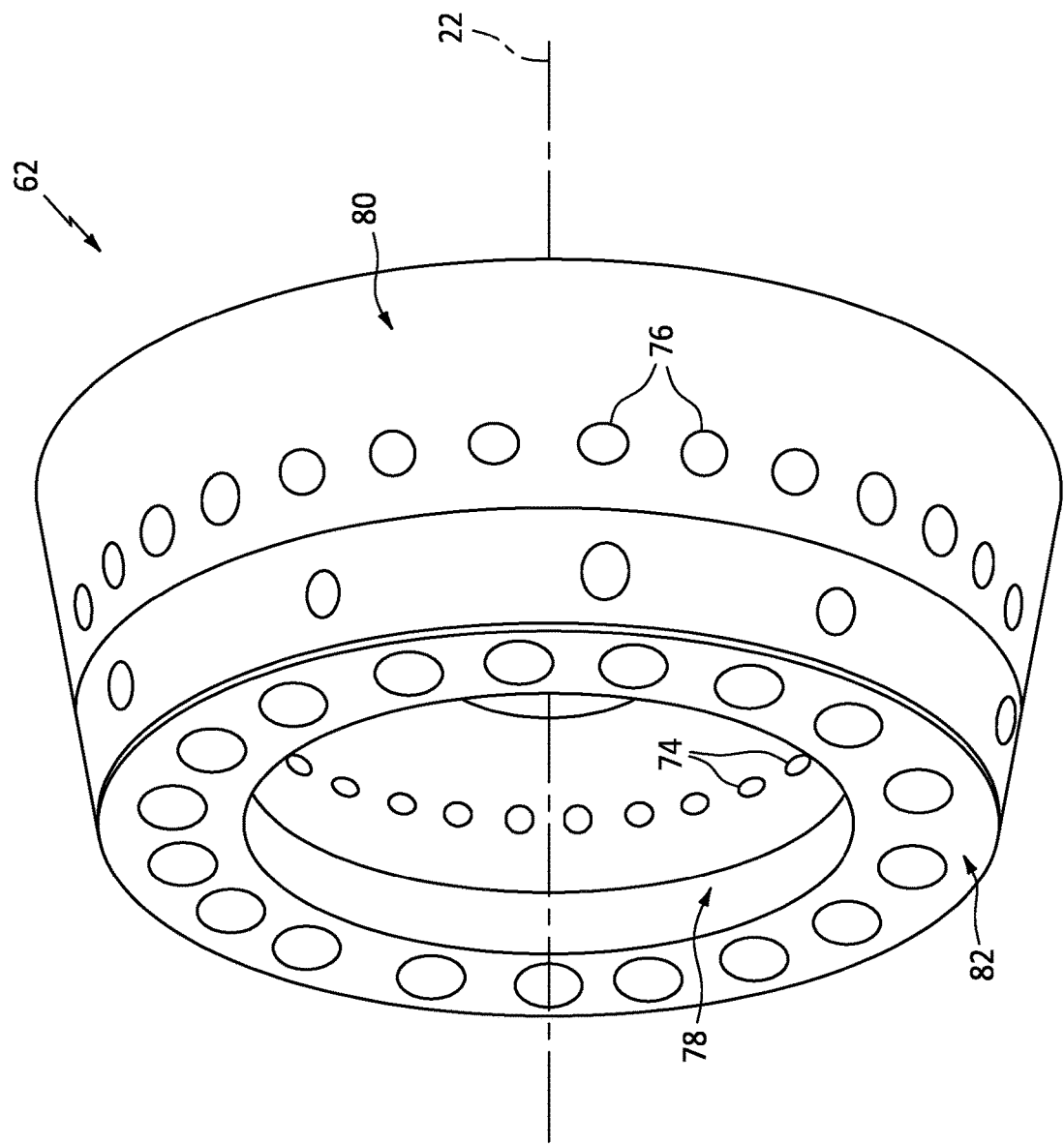
FIG. 3 is a perspective illustration of a combustor.

The combustor 62 may be configured as an annular combustor; e.g., an annular floating wall combustor. The combustor 62 of FIGS. 2 and 3, for example, includes an annular combustor bulkhead wall 82 ("bulkhead"), the tubular inner combustor wall 78 ("inner wall"), and the tubular outer combustor wall 80 ("outer wall"). The combustor 62 of FIG. 2 also includes an annular combustor hood 84.

The bulkhead 82 of FIG. 2 extends radially between and to the inner wall 78 and the outer wall 80. The bulkhead 82 may be connected (e.g., mechanically fastened or otherwise attached) to the inner wall 78 and/or the outer wall 80. Each combustor wall 78, 80 projects axially along the axial centerline 22 out from the bulkhead 82 towards the HPT section 31A. The inner wall 78 of FIG. 2, for example, projects axially to and may be connected to an inner platform 86 of a downstream stator vane array 88 in the HPT section 31A. The outer wall 80 of FIG. 2 projects axially to and may be connected to an outer platform 90 of the downstream stator vane array 88. With the arrangement of FIG. 2, the combustion chamber 60 is formed by and extends radially within the combustor 62 between and to the inner wall 78 and the outer wall 80. The combustion chamber 60 is formed by and extends axially (in an upstream direction along the core flowpath 52) into the combustor 62 from the stator vane array 88 to the bulkhead 82. The combustion chamber 60 also extends within the combustor 62 circumferentially about (e.g., completely around) the axial centerline 22, which may configure the combustion chamber 60 as a full-hoop annulus.

Figure 4:
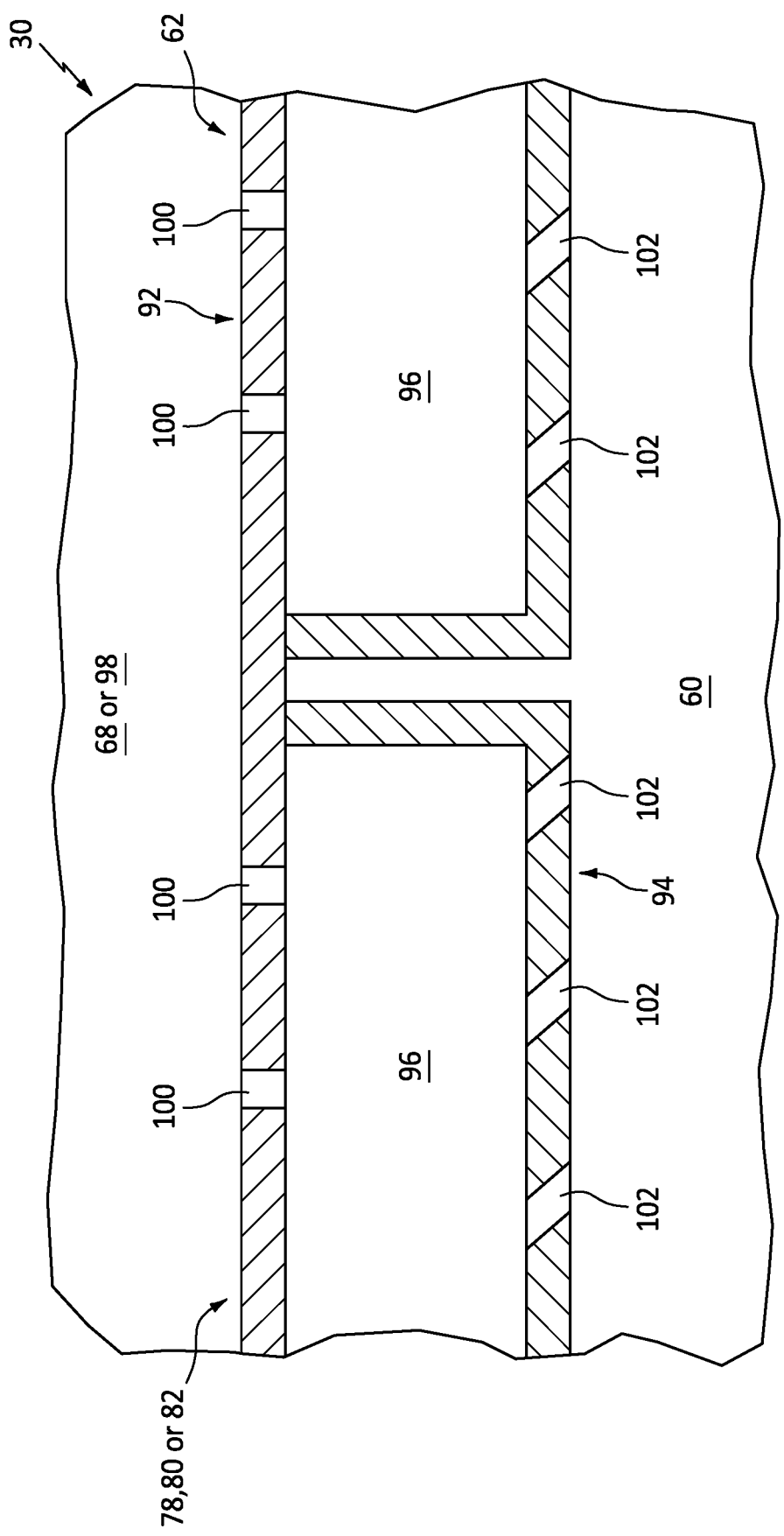
FIG. 4 is a partial sectional illustration of a combustor wall.

Referring to FIG. 4, any one or more or all of the walls 78, 80 and/or 82 may each be configured as a multi-walled structure; e.g., a hollow, dual-walled structure. Each wall 78, 80, 82 of FIG. 4, for example, includes a combustor wall shell 92, a combustor wall heat shield 94 (e.g., a liner) and one or more combustor wall cooling cavities 96 (e.g., impingement cavities) formed by and (e.g., radially and/or axially) between the shell 92 and the heat shield 94. Each cooling cavity 96 of FIG. 4 is fluidly coupled with the diffuser plenum 68 or a hood cavity 98 (see also FIG. 2) through one or more cooling apertures 100 in the shell 92; e.g., impingement apertures. Each cooling cavity 96 of FIG. 4 is fluidly coupled with the combustion chamber 60 through one or more cooling apertures 102 in the heat shield 94; e.g., effusion apertures. Of course, various other multi-walled combustor wall structures are known in the art, and the present disclosure is not limited to any particular ones thereof. Furthermore, it is contemplated any one or more or all of the walls 78, 80 and/or 82 of FIG. 2 may each alternatively be configured as a single-walled structure. The shell 92 of FIG. 4, for example, may be omitted and the heat shield 94 may form a single walled liner/wall. However, for ease of description, each wall 78, 80, 82 may each be described below as the hollow, dual-walled structure.

Referring to FIG. 2, the hood 84 is arranged at (e.g., on, adjacent or proximate) an upstream end of the combustor 62. A radial inner portion 104 of the hood 84 is connected to the inner wall 78 and/or the bulkhead 82 at a radial inner end of the bulkhead 82. A radial outer portion 106 of the hood 84 is connected to the outer wall 80 and/or the bulkhead 82 at a radial outer end of the bulkhead 82. An intermediate portion 108 of the hood 84 is (e.g., axially) spaced from the bulkhead 82. The hood 84 and the bulkhead 82 may thereby form the hood cavity 98 within the combustor 62. This hood cavity 98 extends axially between and to the hood 84 and the bulkhead 82. The hood cavity 98 extends radially between and to the hood inner portion 104 and the hood outer portion 106. The hood cavity 98 extends within the combustor 62 circumferentially about (e.g., completely around) the axial centerline 22, which may configure the hood cavity 98 as a full-hoop annulus.

Figure 5:
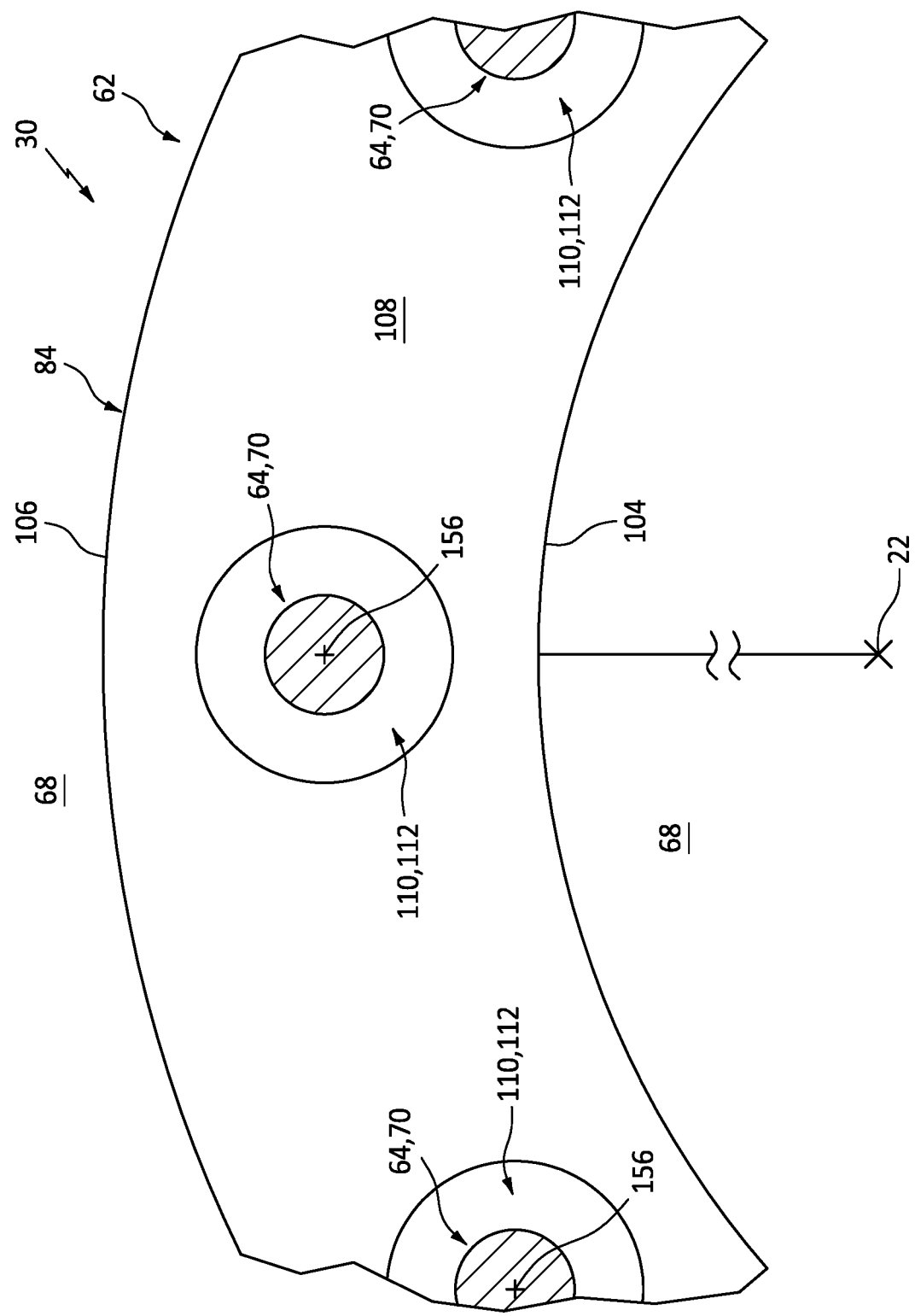
FIG. 5 is a partial sectional illustration through the combustor section adjacent a combustor hood.

Referring to FIG. 5, the hood 84 may include one or more ports 110. These ports 110 are arranged circumferentially about the axial centerline 22 in an array; e.g., a circular array. Referring to FIG. 2, each of the ports 110 extends (e.g., axially) through a sidewall of the hood 84; e.g., in the hood intermediate portion 108. Each port 110 may form a receptacle for a respective one of the fuel injector assemblies 64 and, more particularly, the respective fuel injector 70. Each port 110 may also provide a flowpath for the core air to flow from the diffuser plenum 68 into the hood cavity 98. Each port 110 may be sized, for example, such that a (e.g., annular) gap 112 is formed by and extends between the respective fuel injector 70 and the hood 84; see also FIG. 5.

The bulkhead 82 is (e.g., axially) between and separates the combustion chamber 60 from the hood cavity 98. The hood 84 is (e.g., axially and/or radially) between and separates the hood cavity 98 from the diffuser plenum 68. With this arrangement, the hood cavity 98 forms an intermediate volume between the diffuser plenum 68 and an upstream portion of the combustion chamber 60. The core air, for example, may flow from the diffuser plenum 68 into the hood cavity 98 through each port 110. The core air may then flow from the hood cavity 98 into the combustion chamber 60 through each air swirler structure 72 and/or through each cooling circuit (e.g., collection of cooling apertures and/or cooling cavities) in the bulkhead 82. For example, referring to FIG. 4, each cooling circuit may include the cooling apertures 100, the cooling cavities 96 and the cooling apertures 102 sequentially between and fluidly coupling the hood cavity 98 to the combustion chamber 60.

Referring to FIG. 2, the stator vane array 88 includes the inner platform 86, the outer platform 90 and a plurality of stator vanes 114 (one visible in FIG. 2). The stator vanes 114 are arranged circumferentially about the axial centerline 22 in an array; e.g., a circular array. Each of these stator vanes 114 extends radially across the core flowpath 52 between and to the inner platform 86 and the outer platform 90. Each of the stator vanes 114 may also be connected to the inner platform 86 and/or the outer platform 90. The stator vane array 88 and its stator vanes 114 are configured to turn and/or otherwise condition the combustion products exiting the combustion chamber 60 for interaction with a first stage of the HPT rotor 41 (see FIG. 1).

Figure 6:
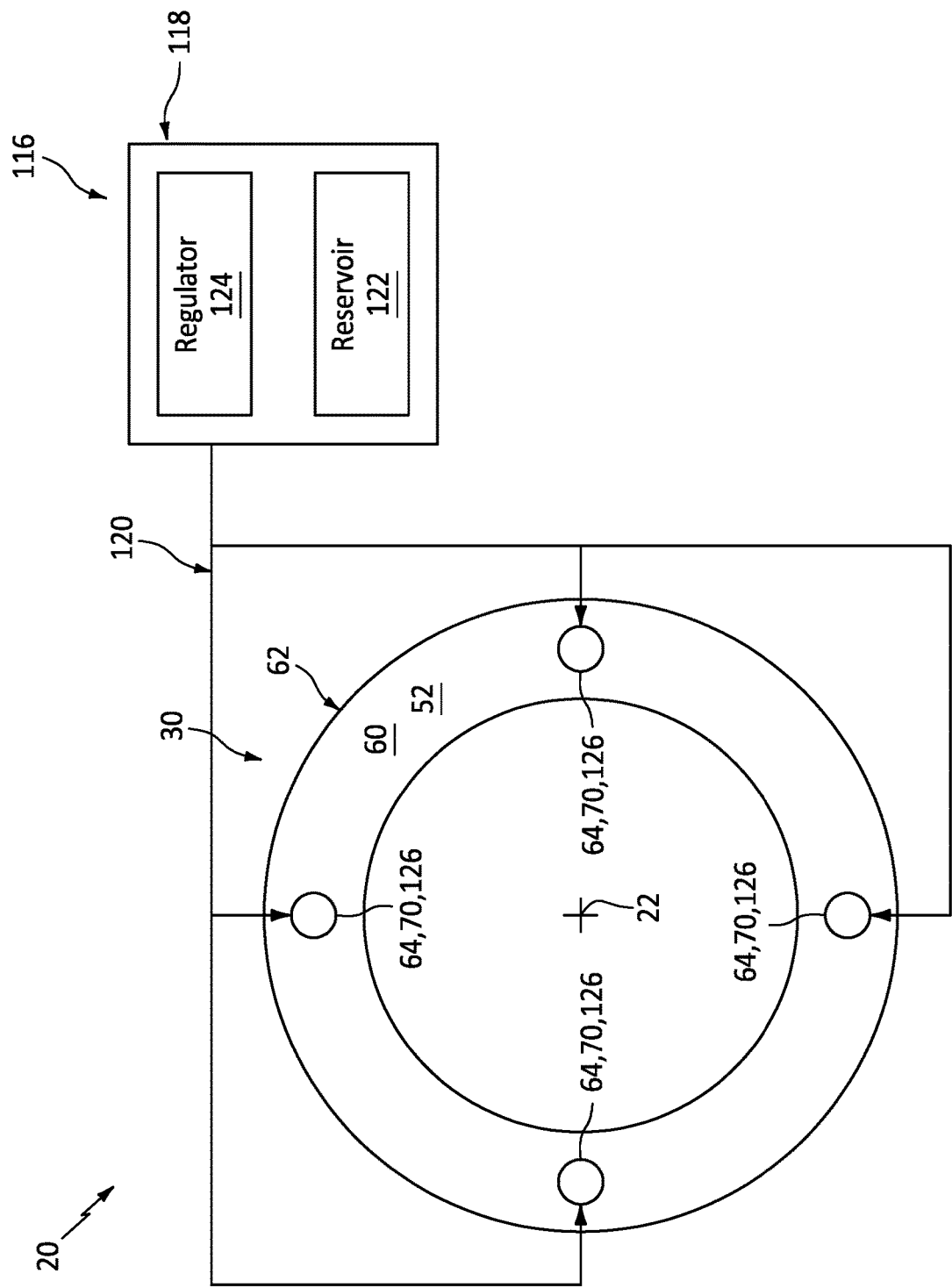
FIG. 6 is a schematic illustration of a fuel system configured with the combustor section.

Referring to FIG. 6, the turbine engine 20 includes a fuel system 116 for delivering the fuel to the combustor 62. This fuel system 116 includes a fuel source 118, a fuel delivery circuit 120 and the one or more fuel injectors 70. The fuel source 118 of FIG. 6 includes a fuel reservoir 122 and/or a fuel flow regulator 124; e.g., a valve and/or a pump. The fuel reservoir 122 is configured to store the fuel before, during and/or after turbine engine operation. The fuel reservoir 122, for example, may be configured as or otherwise include a tank, a cylinder, a pressure vessel, a bladder or any other type of fuel storage container. The fuel flow regulator 124 is configured to direct and/or meter a flow of the fuel from the fuel reservoir 122 to one or more or all of the fuel injectors 70 through the fuel delivery circuit 120. The fuel injectors 70 may be arranged circumferentially about the axial centerline 22 in an array. Each fuel injector 70 includes a fuel nozzle 126 configured to direct the fuel received from the fuel source 118 into the combustion chamber 60 for combustion.

The fuel delivered by the fuel system 116 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel system 116, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel system 116 may be configured as a multi-fuel system operable to deliver, individually or in combination, multiple different fuels (e.g., a non-hydrocarbon fuel and a hydrocarbon fuel, etc.) for combustion within the combustion chamber 60. The turbine engine 20 of FIG. 1 may thereby be configured as a multi-fuel turbine engine; e.g., a dual-fuel turbine engine. However, for ease of description, the fuel delivered by the fuel system 116 may be described below as the non-hydrocarbon fuel; e.g., the hydrogen fuel.

Figure 7:
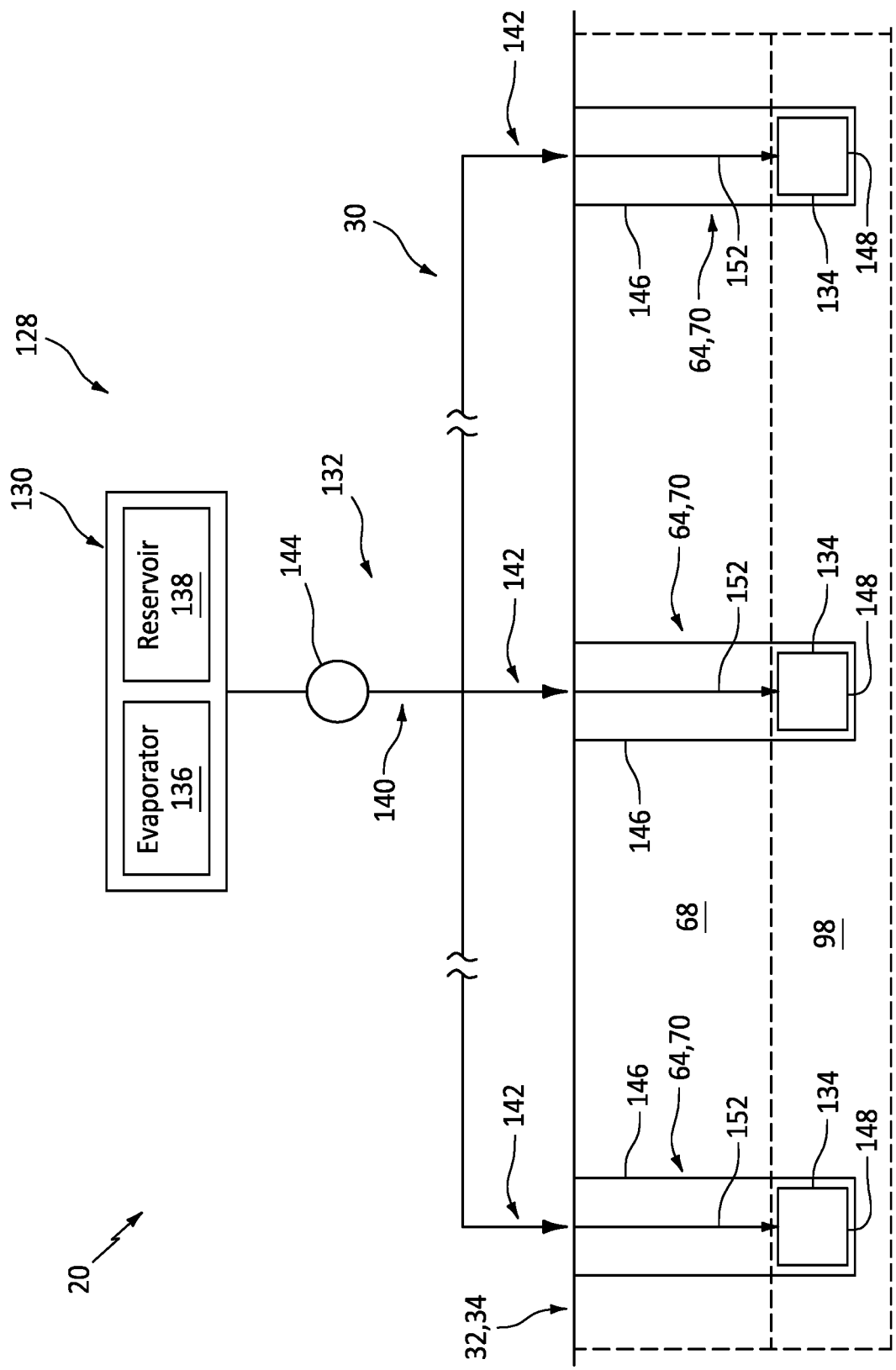
FIG. 7 is a schematic illustration of a steam system arranged with the combustor section.

Referring to FIG. 7, the turbine engine 20 includes a steam system 128 for selectively delivering steam to the combustor 62 (see FIG. 2). The steam system 128 of FIG. 7 includes a steam source 130, a steam delivery circuit 132 and one or more steam nozzles 134 (see FIG. 2). Briefly, referring to FIG. 2, the steam nozzles 134 are arranged along the core flowpath 52 upstream of the combustion chamber 60. More particularly, the steam nozzles 134 of FIG. 2 are respectively configured with the fuel injectors 70 and operable to inject the steam into the hood cavity 98. Within the hood cavity 98, the steam mixes with core air received from the diffuser plenum 68. The mixture of core air and steam ("air-steam mixture") may be directed into the combustion chamber 60 through each air swirler structure 72 and/or across the bulkhead 82 through each cooling circuit (see FIG. 4) as described above. The steam may thereby enhance cooling of the bulkhead 82 and the air swirler structures 72 as well as reduce a temperature of the combustion products flowing within the combustion chamber 60 and into the stator vane array 88. Reducing the combustion products temperature may reduce thermal stresses on components contacting the combustion products. Reducing the combustion products temperature may also facilitate a reduction of nitrogen oxide (NOx) production/formation in the combustion products. Furthermore, by introducing the steam into the hood cavity 98 (rather than within the diffuser plenum 68 upstream of the hood cavity 98), the steam may be targeted for flow into the combustion chamber 60 through each air swirler structure 72 and/or across the bulkhead 82.

Referring to FIG. 7, the steam source 130 is configured to provide the steam to the steam delivery circuit 132 during turbine engine operation and, more particularly, during steam system operation. The steam source 130, for example, may be configured as or otherwise include an evaporator 136, which may be or otherwise include a fluid-to-fluid heat exchanger and/or an electrical heater. The evaporator 136 is configured to evaporate water into the steam during steam system operation. The water may be received from various sources. The steam source 130 of FIG. 7, for example, includes a water reservoir 138 fluidly coupled with and upstream of the evaporator 136. This water reservoir 138 is configured to store the water before, during and/or after turbine engine operation. Examples of the water reservoir 138 include, but are not limited to, a tank, a cylinder, a pressure vessel, a bladder or any other type of water storage container. Briefly, the water may be supplied to the water reservoir 138 by recovering water vapor from the combustion products flowing through the core flowpath 52 (see FIG. 1) and/or from another water source onboard or offboard an aircraft.

The steam delivery circuit 132 of FIG. 7 includes a supply circuit 140 and one or more feed circuits 142, where each feed circuit 142 is associated with a respective one of the steam nozzles 134. The supply circuit 140 of FIG. 7 extends from an outlet from the steam source 130 to an interface with the feed circuits 142 such as a manifold. At the interface, the feed circuits 142 may be fluidly coupled in parallel to and downstream of the supply circuit 140. Each of the feed circuits 142 extends from the interface to a steam inlet of a respective one of the fuel injectors 70. The steam delivery circuit 132 thereby fluidly couples the steam source 130 to the respective fuel injectors 70 and their steam nozzles 134.

The steam directed through the steam delivery circuit 132 may be regulated based on the combustion process within the combustion chamber 60 and/or based on a mode of turbine engine operation. The steam delivery circuit 132 of FIG. 7 includes a steam flow regulator 144. The steam flow regulator 144 is arranged (e.g., fluidly coupled inline) with the supply circuit 140. The steam flow regulator 144 is configured to selectively direct and/or meter a flow of the steam from the steam source 130 to the fuel injectors 70 and their steam nozzles 134. For example, the steam flow regulator 144 may be configured as or otherwise include a control valve. This control valve may fully open, may fully close and/or may move to one or more partially open positions. While the steam flow regulator 144 is illustrated in FIG. 7 as being part of the supply circuit 140, that steam flow regulator 144 may alternatively be arranged at the interface between the supply circuit 140 and the feed circuits 142, at an inlet to the supply circuit 140, or otherwise. One or more or all of the feed circuits 142 may also or alternatively be provided with its own steam flow regulator. Furthermore, it is contemplated the steam delivered to one or more or all of the steam nozzles 134 may still also or alternatively be regulated by adjusting an amount of steam provided (e.g., produced) by the steam source 130.

Figure 8:
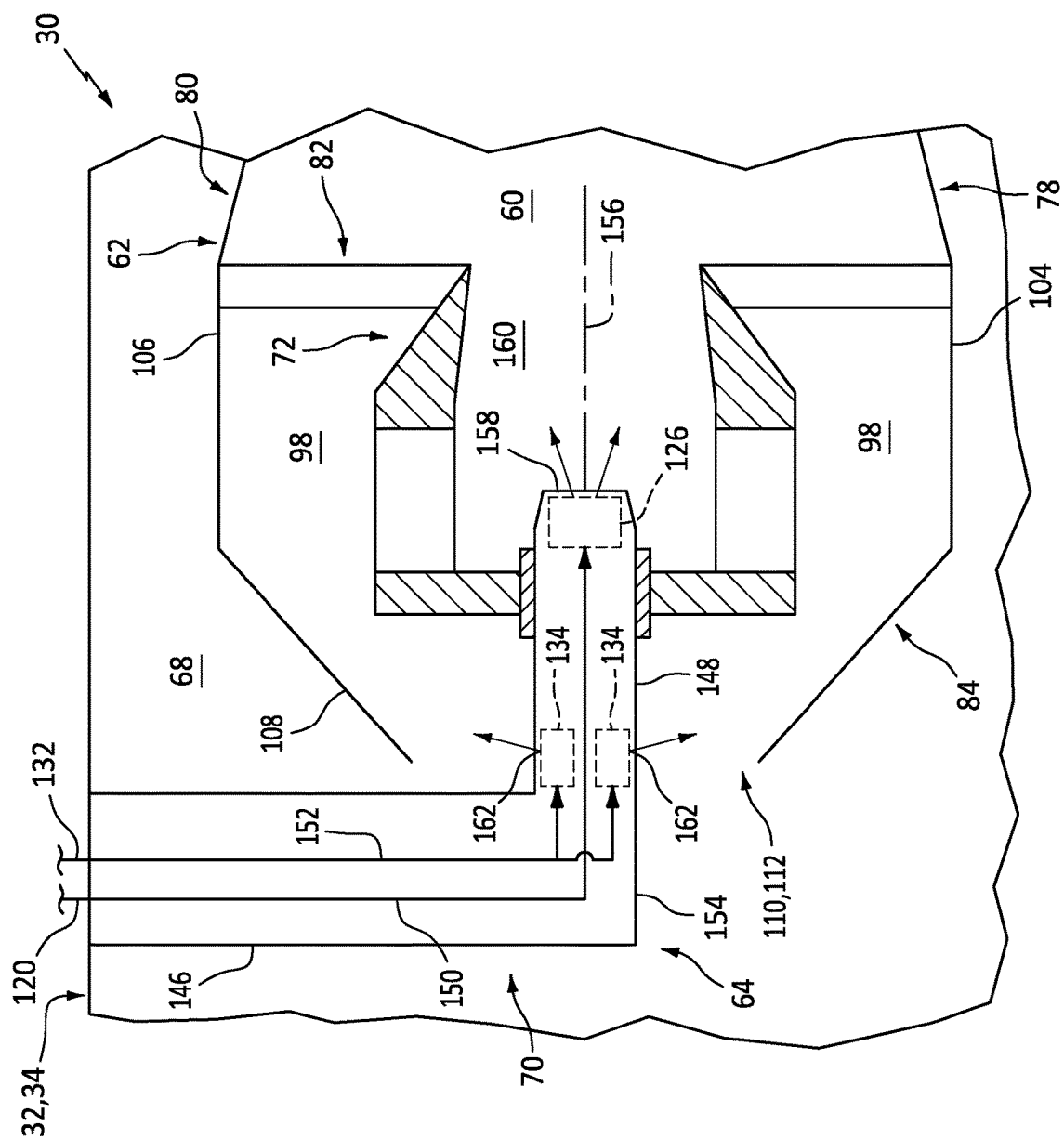
FIG. 8 is a partial schematic illustration of the combustor section with a steam nozzle configured in a fuel injector.

Referring to FIG. 8, each steam nozzle 134 may be configured as part of a respective one of the fuel injectors 70. The fuel injector 70 of FIG. 8, for example, includes a fuel injector stem 146, a fuel injector nozzle 148, a fuel passage 150 and a steam passage 152. The injector nozzle 148 of FIG. 8 includes a respective one of the fuel nozzles 126 and the respective steam nozzle 134.

The injector stem 146 is configured to support the injector nozzle 148 and thereby the fuel nozzle 126 and the steam nozzle 134. The injector stem 146 of FIG. 8 is connected to the engine housing 32 and its inner case 34, where the housing 32 and its inner case 34 are radially outboard of and form an outer peripheral boundary of the diffuser plenum 68. The injector stem 146 projects radially into the diffuser plenum 68 from the engine housing 32 and its inner case 34 to an inner distal end 154 of the injector stem 146.

The injector nozzle 148 is connected to the injector stem 146. The injector nozzle 148 of FIG. 8, for example, is cantilevered from the injector stem 146 at the end 154 of the injector stem 146. The injector nozzle 148 projects longitudinally along a longitudinal centerline 156 of the injector nozzle 148 out from the injector stem 146 into the hood cavity 98 to a tip 158 of the injector nozzle 148, where the longitudinal centerline 156 may be parallel with or angularly offset from the axial centerline 22 of FIG. 2. The injector nozzle 148 of FIG. 8 may also project partially longitudinally into an interior passage 160 of the respective air swirler structure 72 to its nozzle tip 158. Here, the injector nozzle 148 of FIG. 8 is mated with the respective air swirler structure 72.

The fuel passage 150 is fluidly coupled with the fuel source 118 (see FIG. 6) through the fuel delivery circuit 120, which fuel delivery circuit 120 may be arranged outside of the diffuser plenum 68 and/or radially outboard of the inner case 34. The fuel passage 150 extends radially with the injector stem 146 and to the injector nozzle 148. The fuel passage 150 extends longitudinally within the injector nozzle 148 to the fuel nozzle 126. This fuel nozzle 126 of FIG. 8 is disposed at the nozzle tip 158. With this arrangement, the fuel nozzle 126 may be configured to inject the fuel into the combustion chamber 60 through the respective air swirler structure 72 and its interior passage 160.

The steam passage 152 is fluidly coupled with the steam source 130 (see FIG. 7) through the steam delivery circuit 132, which steam delivery circuit 132 may be arranged outside of the diffuser plenum 68 and/or radially outboard of the inner case 34. The steam passage 152 extends radially within the injector stem 146 and to the injector nozzle 148. The steam passage 152 extends longitudinally within the injector nozzle 148 to the steam nozzle 134. This steam nozzle 134 may be disposed longitudinally along the injector nozzle 148 between the injector stem 146 and the fuel injector 70. The steam nozzle 134 of FIG. 8, for example, is disposed at (or close to) an intersection (e.g., a connection) between the injector nozzle 148 and the injector stem 146.

The steam nozzle 134 includes one or more steam outlets 162. Referring to FIG. 9, the steam outlets 162 are arranged circumferentially about the longitudinal centerline 156 in an array; e.g., a circular array. Each of the steam outlets 162 is configured to direct a flow (e.g., a stream, a jet, etc.) of the steam into the hood cavity 98 along a respective trajectory. This steam trajectory may have a (e.g., non-zero) radial component and/or a (e.g., non-zero) longitudinal component relative to the longitudinal centerline 156. The steam trajectory may also have a (e.g., non-zero) circumferential component about the longitudinal centerline 156. However, in other embodiments, the steam trajectory may only include the radial component, or the radial component and the circumferential component. With the arrangement of FIGS. 8 and 9, the steam nozzle 134 is configured to direct the steam across and/or with a flow of the core air flowing through a respective one of the ports 110 from the diffuser plenum 68 into the hood cavity 98. This may facilitate mixing of the steam with the core air to provide the air-steam mixture for introduction into the combustion chamber 60.

Figure 10B:
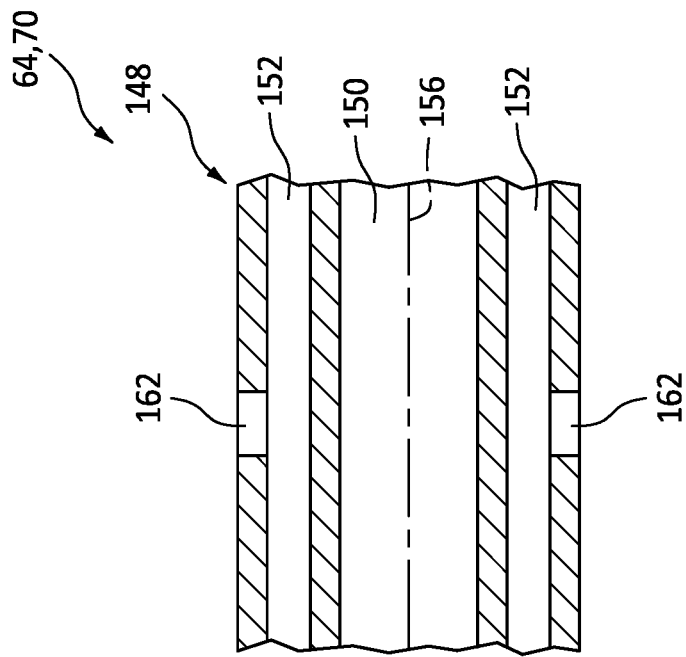
FIGS. 10A and 10B are partial sectional illustrations of the fuel injector with various steam nozzle arrangements.
Figure 10A:
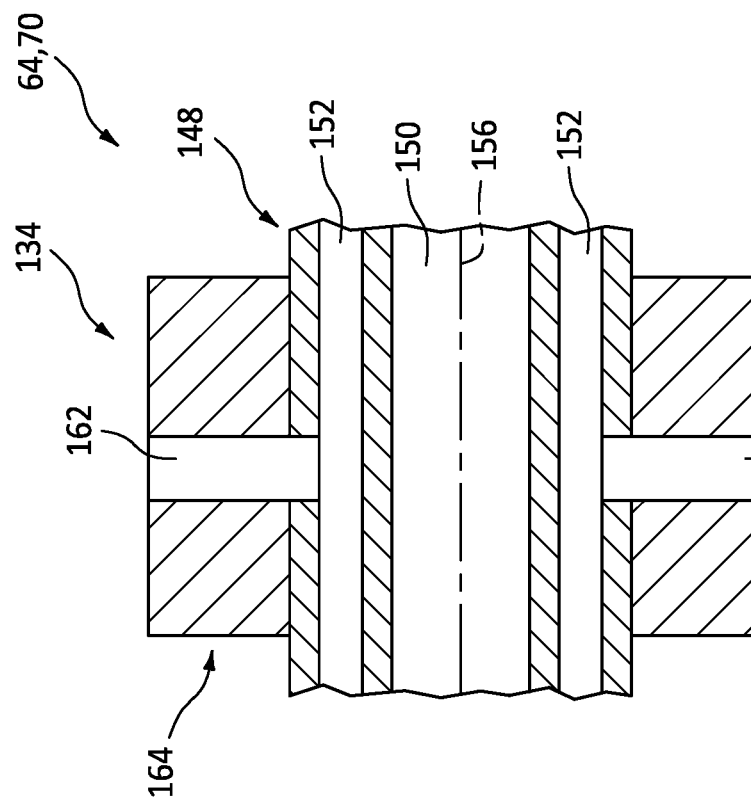

In some embodiments, referring to FIG. 10A, the steam nozzle 134 may be configured as a collar 164 circumscribing the injector nozzle 148. In other embodiments, referring to FIG. 10B, the steam nozzle 134 may be configured as a perforated sidewall of the injector nozzle 148.

Figure 11:
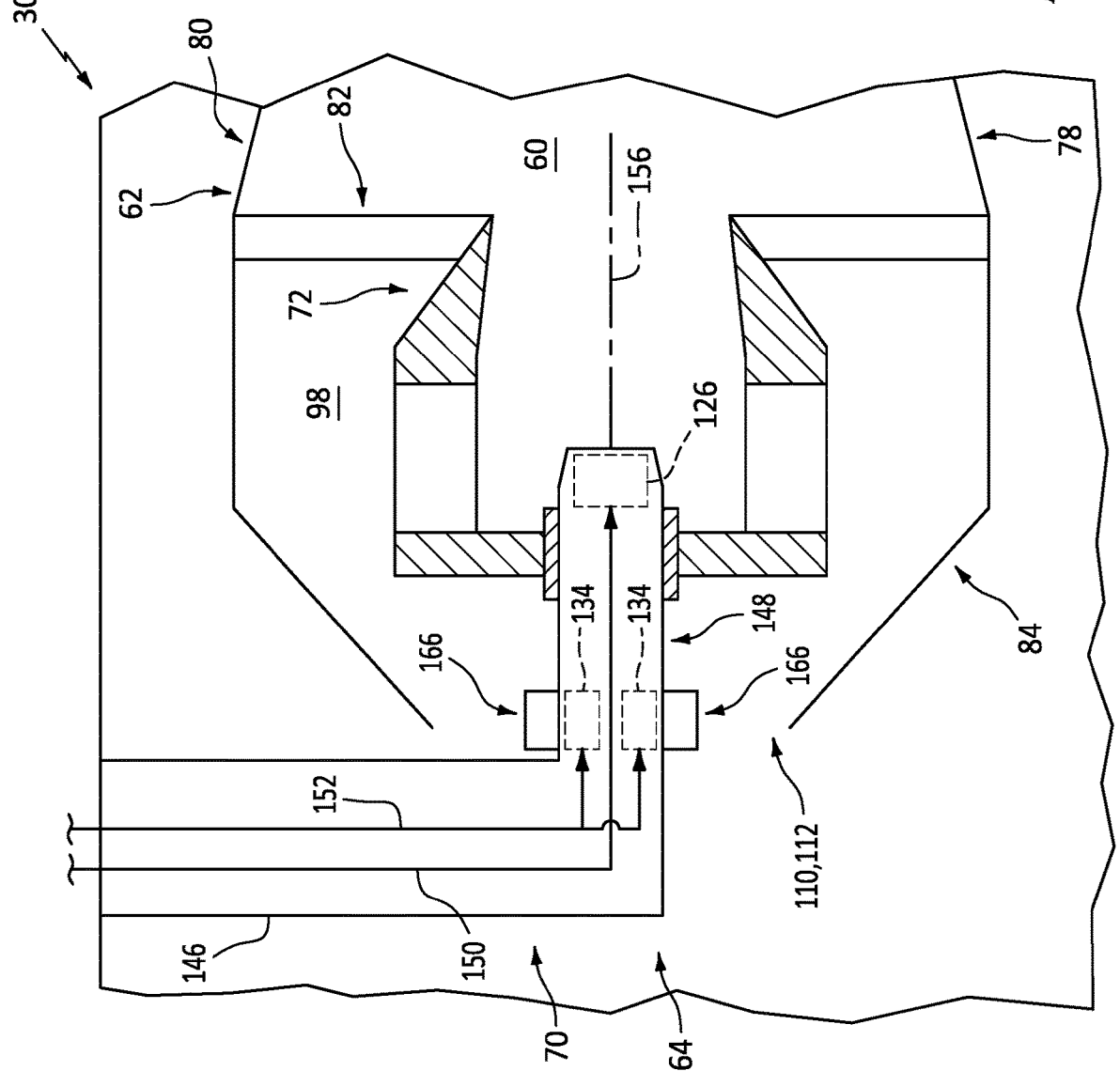
FIGS. 11-15 are partial schematic illustrations of the combustor section with various steam nozzle arrangements.

Referring to FIG. 11, the steam nozzle 134 may be arranged with a (e.g., annular) steam swirler 166 to further promote the mixing of the steam with the air. This steam swirler 166 is configured to swirl the steam injected by the steam nozzle 134 into the hood cavity 98 to provide a flow of swirled steam within the hood cavity 98. The steam swirler 166 may include a plurality of swirler vanes arranged circumferentially about the steam nozzle 134 in an array. These swirler vane may be configured as part of or connected to the fuel injector 70 and its injector nozzle 148. Alternatively, the steam swirler 166 may be included as part of the steam nozzle 134 where, for example, each steam outlet 162 is configured to provide the steam trajectory with the circumferential component that facilitates swirl.

Figure 12:
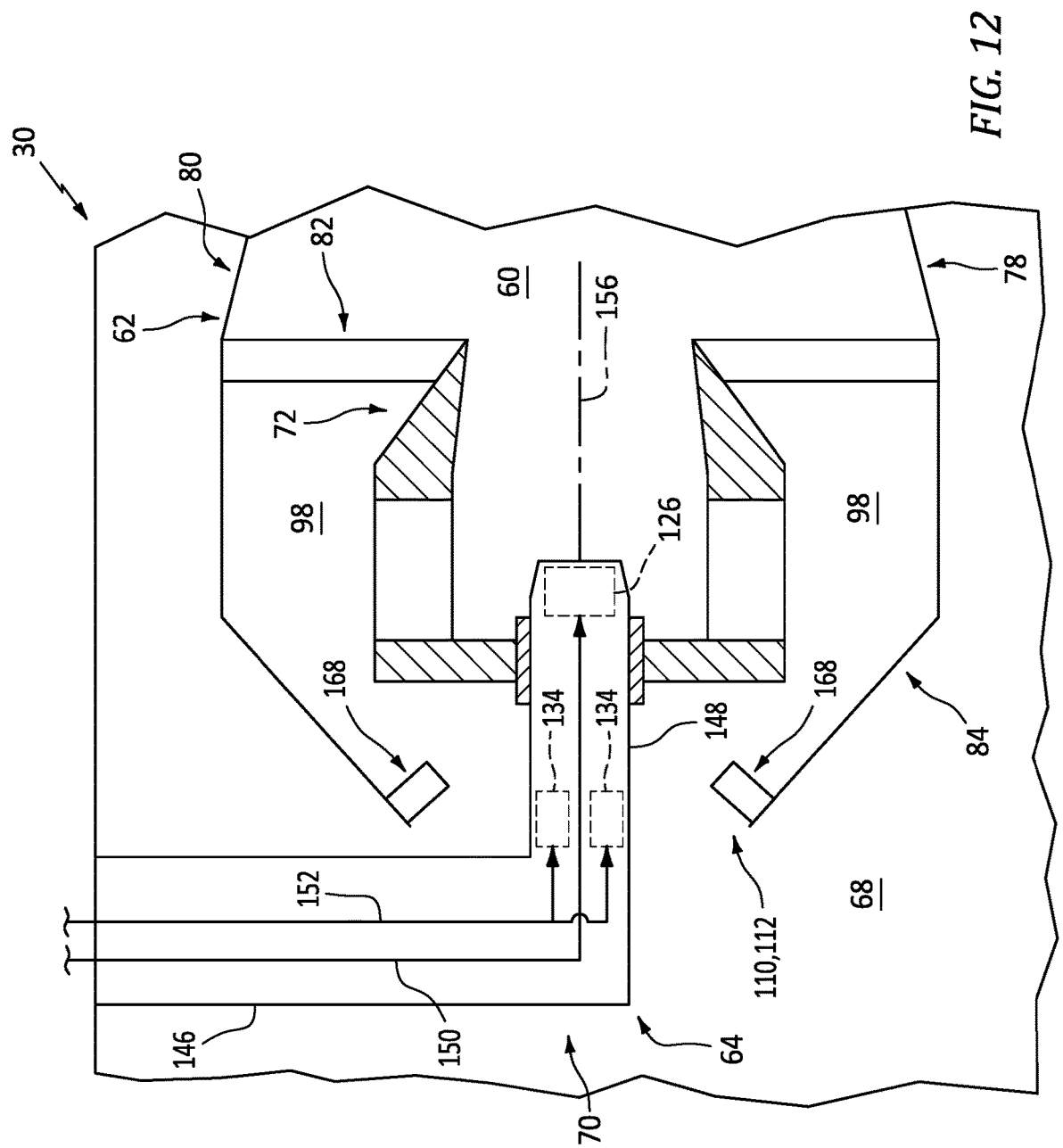

Referring to FIG. 12, the steam nozzle 134 may also or alternatively be arranged with an (e.g., annular) air swirler 168 to further promote the mixing of the steam with the air. This air swirler 168 is configured to swirl the core air entering the hood cavity 98 from the diffuser plenum 68 through the respective port 110 to provide a flow of swirled core air within the hood cavity 98. The air swirler 168 may include a plurality of swirler vanes arranged circumferentially about the steam nozzle 134 in an array. These swirler vane may be configured as part of or connected to the hood 84, and radially spaced outward from the respective injector nozzle 148 and its steam nozzle 134.

Figure 13:
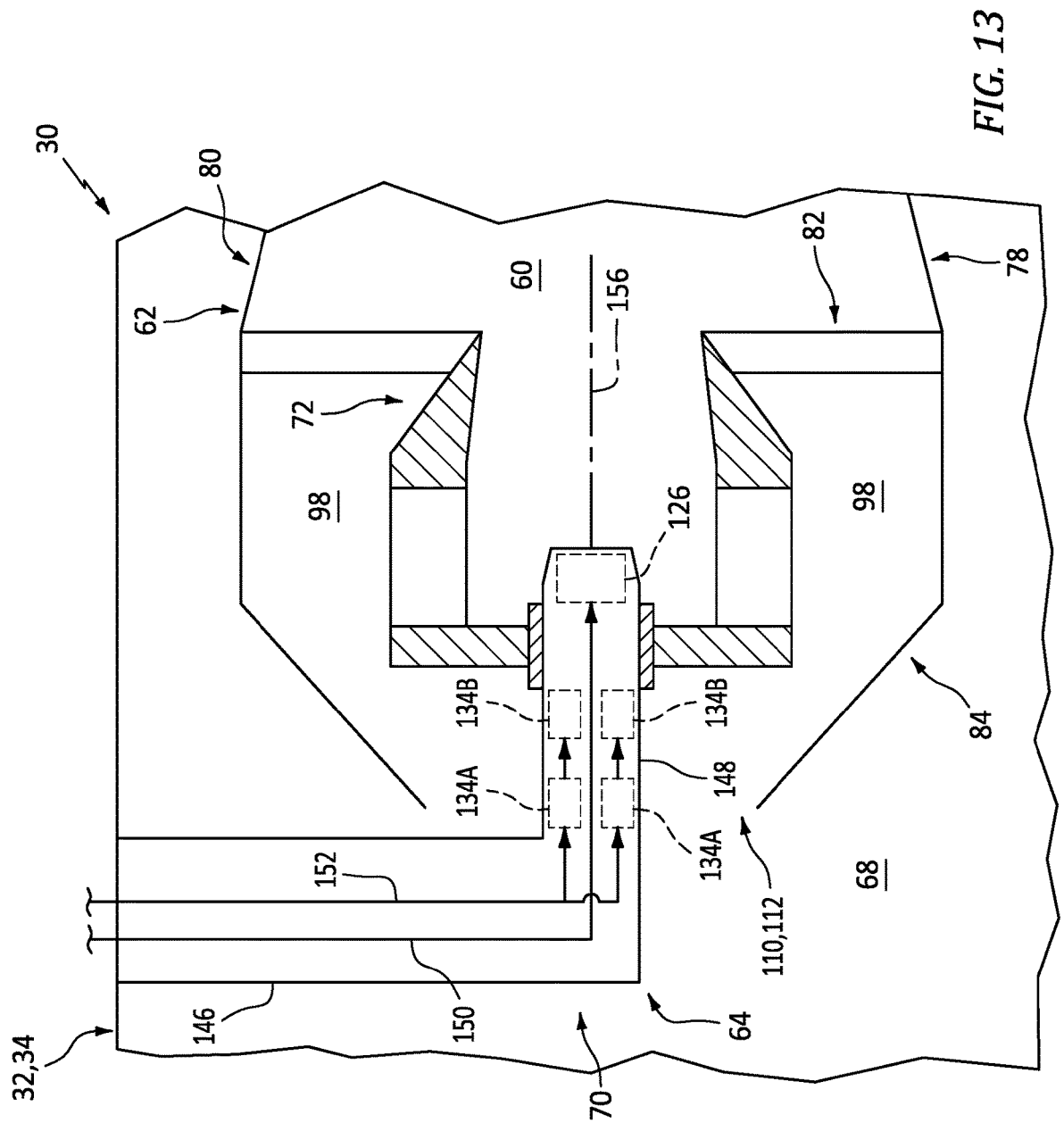

In some embodiments, referring to FIG. 9, the fuel injector 70 and its injector nozzle 148 may be configured with a single one of the steam nozzles 134. In other embodiments, referring to FIG. 13, the fuel injector 70 and its injector nozzle 148 may be configured with multiple of the steam nozzles 134A and 134B (generally referred to as "134"). Each of these steam nozzles 134 may have a similar (or the same) configured as described above. The steam nozzles 134A and 134B are arranged longitudinally along the longitudinal centerline 156. The downstream steam nozzle 134B of FIG. 13 is disposed longitudinally between the fuel nozzle 126 and the upstream steam nozzle 134A. This downstream steam nozzle 134B may be disposed longitudinally adjacent and outside of the respective air swirler structure 72. The upstream steam nozzle 134A is disposed longitudinally between the injector stem 146 and the downstream steam nozzle 134B. This upstream steam nozzle 134A is longitudinally spaced from the downstream steam nozzle 134B and/or the injector stem 146. With this arrangement, the multiple steam nozzles 134 may provide staged steam injection into the hood cavity 98.

Figure 14:
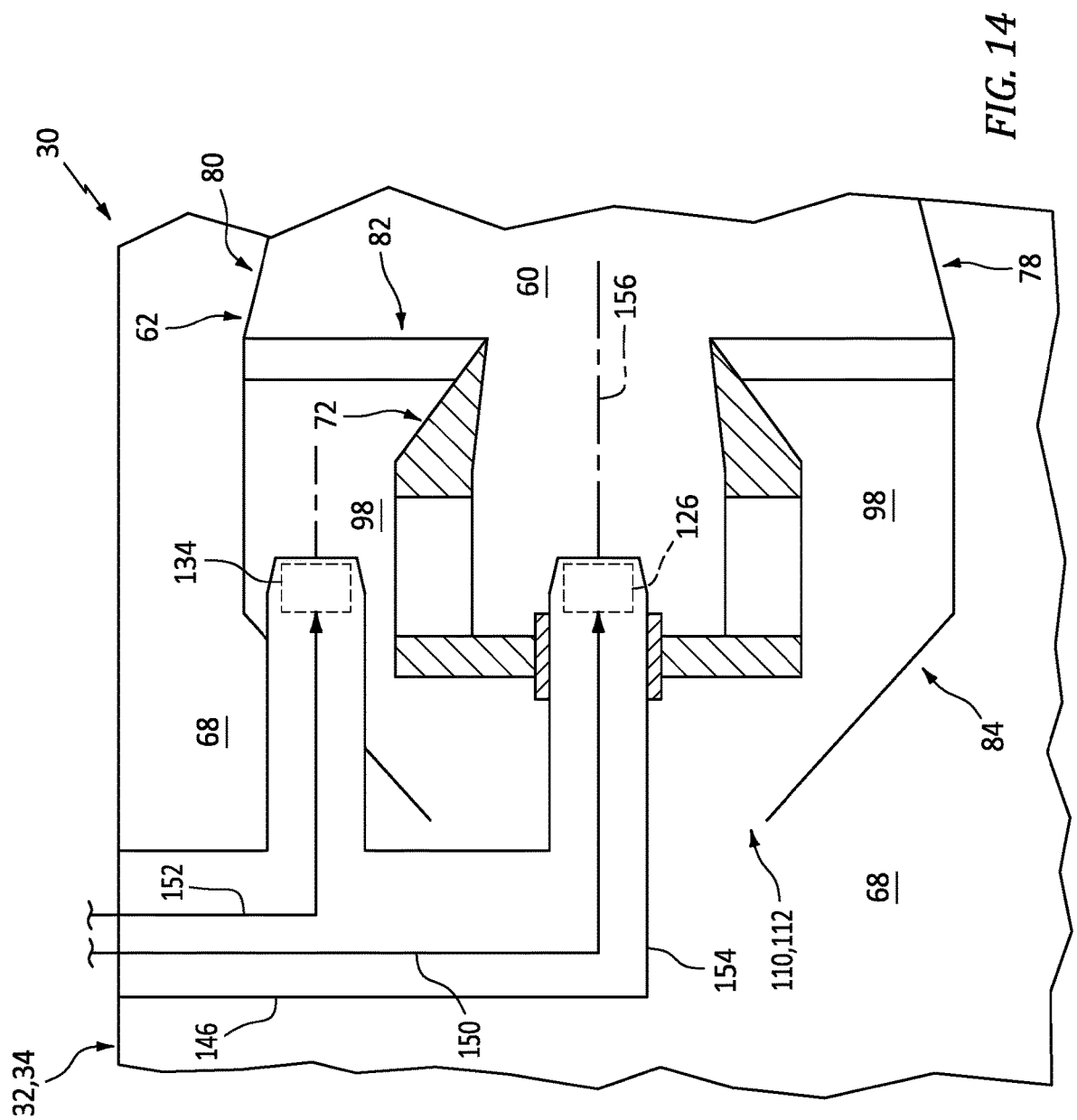

While each steam nozzle 134 is described above as being configured with the respective fuel nozzle 126 in a common (e.g., the same) nozzle structure—the injector nozzle 148, the present disclosure is not limited to such an arrangement. For example, referring to FIG. 14, the steam nozzle 134 may be configured discrete (e.g., physically distinct, spaced from, etc.) from the fuel nozzle 126. The steam nozzle 134 and the fuel nozzle 126 of FIG. 14, for example, are discretely located along the injector stem 146. The fuel nozzle 126 may be disposed at the end 154 of the injector stem 146. The steam nozzle 134 may be disposed (e.g., radially relative to the axial centerline 22; see FIG. 2) between and spaced from the fuel nozzle 126 and a base of the injector stem 146/the inner case 34. Each of these nozzles 126, 134 may be connected to and cantilevered from the injector stem 146. Each of the nozzles 126, 134 may project longitudinally out from the injector stem 146 into the hood cavity 98.

Figure 15:
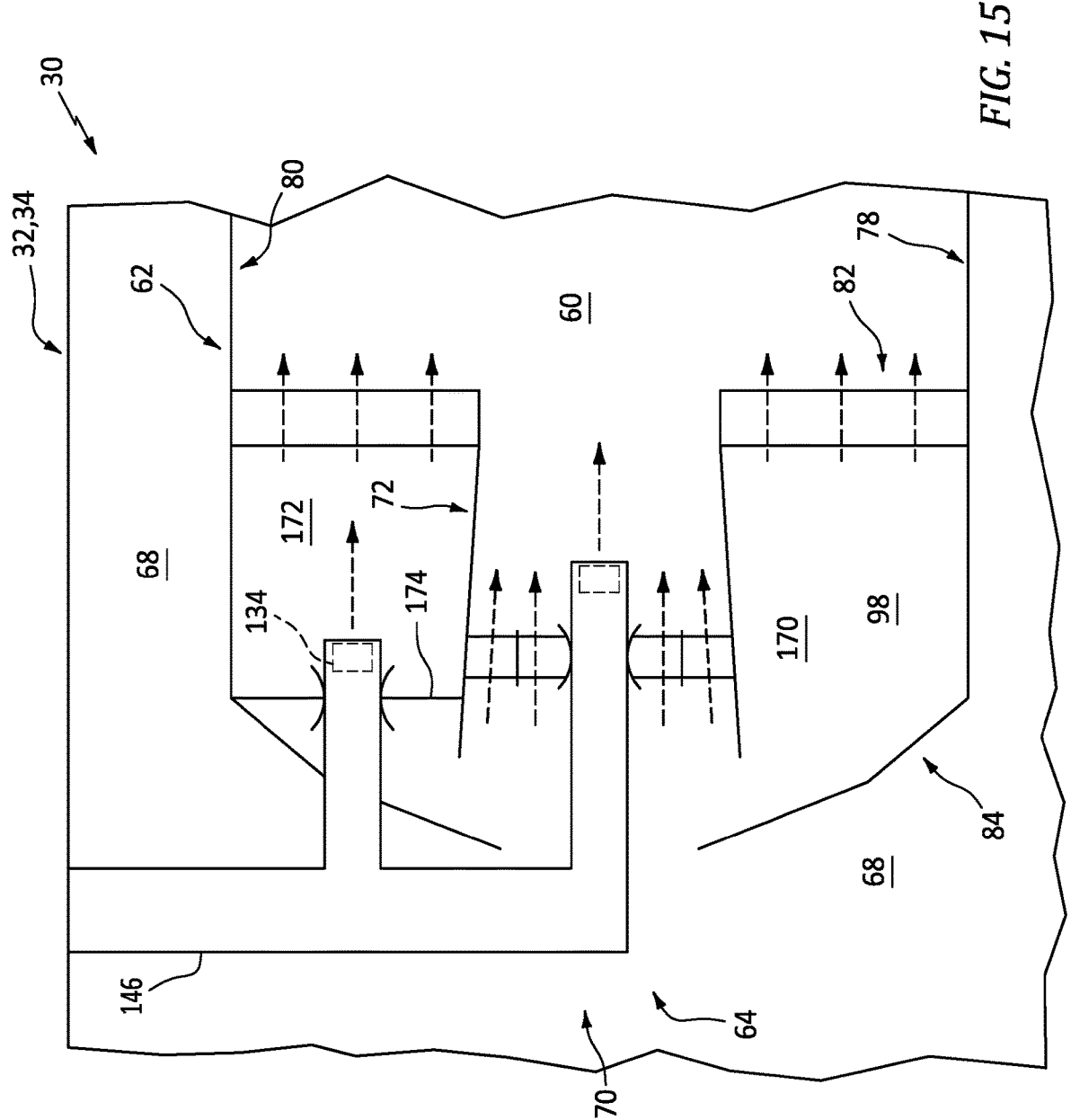

In some embodiments, referring to FIG. 15, the hood cavity 98 may be divided into an air plenum 170 and a steam plenum 172. The air plenum 170 may be fed by the core air from the diffuser plenum 68. The steam plenum 172 may be fed by the steam nozzle 134. The air plenum 170 may be separated from the steam plenum 172 by a hood bulkhead 174. Here, the steam plenum 172 may only receive the steam from the steam nozzle(s) 134. Alternatively, the steam plenum 172 may receive the steam from the steam nozzle(s) 134 as well as some of the core air from the air plenum 170 (or directly from the diffuser plenum 68).

In some embodiments, the steam system 128 of FIG. 7 may selectively introduce the steam into the hood cavity 98 based on a mode of operation. For example, when the turbine engine 20 is operating at idle and/or otherwise low throttle, cooling demands and/or combustion products temperature of the turbine engine 20 may be relatively low. The steam system 128 may therefore introduce little or no steam into the hood cavity 98. Here, cooling needs may be fulfilled by air cooling. However, when the turbine engine 20 is operating at mid throttle and/or high throttle, the cooling demands and/or the combustion products temperature of the turbine engine 20 may be relatively high. The steam system 128 may therefore start to introduce or introduce more of the steam into the hood cavity 98 to supplement the air cooling.

In some embodiments, each fuel injector 70 may include a respective fuel nozzle 126 and a respective steam nozzle 134. In other embodiments, one or more of the fuel injectors 70 may be configured without a steam nozzle 134. For example, every other fuel injector 70, every second fuel injector 70, etc. about the axial centerline 22 may be configured with a respective steam nozzle 134 while the other remaining fuel injectors 70 may be configured without any steam nozzle 134.

The steam system 128 may be included in various turbine engines other than the one described above. The steam system 128, for example, may be included in a geared turbine engine where a geartrain connects one or more shafts to one or more rotors in a fan section, a compressor section and/or any other engine section. Alternatively, the steam system 128 may be included in a turbine engine configured without a geartrain; e.g., a direct drive turbine engine. The steam system 128 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
   a housing including a case and a diffuser plenum radially within the case, the case extending axially along and circumferentially about a centerline;
   a combustor disposed within the diffuser plenum, the combustor including a bulkhead, a hood, a combustion chamber and a hood cavity, the bulkhead axially between the combustion chamber and the hood cavity, and the hood between the hood cavity and the diffuser plenum; and
   a fuel injector assembly projecting radially into the diffuser plenum from the case, the fuel injector assembly including a fuel nozzle, a steam passage and a steam nozzle, the fuel nozzle configured to inject fuel into the combustion chamber, the steam passage for carrying steam along a longitudinal centerline, the steam nozzle configured to receive the steam from the steam passage and to inject the steam into the hood cavity, the steam nozzle comprising a plurality of steam outlets arranged circumferentially about the longitudinal centerline in an array, and a first of the plurality of steam outlets configured to direct a flow of the steam into the hood cavity along a trajectory with a radial component away from the longitudinal centerline wherein the first of the plurality of steam outlets is radially outward of the steam passage relative to the longitudinal centerline.

2. The assembly of claim 1, wherein
   the fuel injector assembly further includes an injector stem and an injector nozzle;
   the injector stem is connected to and projects radially inward from the case; and
   the injector nozzle is cantilevered from the injector stem, and the injector nozzle includes the fuel nozzle and the steam nozzle.

3. The assembly of claim 2, wherein the injector nozzle projects out from the injector stem and into the hood cavity.

4. The assembly of claim 3, wherein the fuel nozzle and the steam nozzle are disposed within the hood cavity.

5. The assembly of claim 2, wherein
   the injector nozzle projects longitudinally out from the injector stem along a along the longitudinal centerline to a tip of the injector nozzle;
   the fuel nozzle is arranged at the tip of the injector nozzle; and
   the steam nozzle is arranged longitudinally along the longitudinal centerline between the injector stem and the fuel nozzle.

6. The assembly of claim 5, wherein the steam nozzle is disposed adjacent the injector stem.

7. The assembly of claim 5, wherein the steam nozzle is longitudinally spaced from the injector stem.

8. An assembly for a turbine engine, comprising:
   a housing including a case and a diffuser plenum radially within the case, the case extending axially along and circumferentially about a centerline;
   a combustor disposed within the diffuser plenum, the combustor including a bulkhead, a hood, a combustion chamber and a hood cavity, the bulkhead axially between the combustion chamber and the hood cavity, and the hood between the hood cavity and the diffuser plenum; and
   a fuel injector assembly projecting radially into the diffuser plenum from the case, the fuel injector assembly including a fuel nozzle, a steam nozzle, an injector stem and an injector nozzle, the fuel nozzle configured to inject fuel into the combustion chamber, the steam nozzle configured to inject steam into the hood cavity, the injector stem connected to and projecting radially inward from the case, the injector nozzle cantilevered from the injector stem, the injector nozzle including the fuel nozzle and the steam nozzle;
   wherein the injector nozzle projects longitudinally out from the injector stem along a longitudinal centerline to a tip of the injector nozzle;
   wherein the fuel nozzle is arranged at the tip of the injector nozzle;
   wherein the steam nozzle is arranged longitudinally along the longitudinal centerline between the injector stem and the fuel nozzle; and
   wherein the steam nozzle is a first steam nozzle, and the fuel injector assembly further includes a second steam nozzle arranged longitudinally along the longitudinal centerline between the injector stem and the first steam nozzle.

9. The assembly of claim 1, wherein the trajectory further has an axial component.

10. The assembly of claim 1, further comprising a steam swirler configured to swirl the steam directed into the hood cavity.

11. The assembly of claim 1, further comprising an air swirler configured to swirl air flowing into the hood cavity from the diffuser plenum.

12. The assembly of claim 1, wherein
   the fuel injector assembly further includes an injector stem;

the injector stem is connected to and projects radially inward from the case;

the fuel nozzle and the steam nozzle are each cantilevered from the injector stem; and the steam nozzle is arranged radially along the injector stem between the fuel nozzle and the case.

13. The assembly of claim 1, wherein the bulkhead includes a cooling circuit fluidly coupled with and between the hood cavity and the combustion chamber; and the cooling circuit is configured to direct the steam from the hood cavity, across the bulkhead, and into the combustion chamber.

14. The assembly of claim 1, wherein the fuel injector assembly further includes an air swirler structure; and the fuel nozzle is configured to inject the fuel into the combustion chamber through the air swirler structure, the air swirler structure is configured to direct swirled fluid into the combustion chamber with the fuel, and the swirled fluid comprises compressed air.

15. The assembly of claim 14, wherein the swirled fluid further comprises the steam.

16. An assembly for a turbine engine, comprising:

a housing comprising a diffuser plenum;

a combustor disposed within the diffuser plenum, the combustor including a bulkhead, a hood, a combustion chamber and a hood cavity, the bulkhead between the combustion chamber and the hood cavity, the hood between the hood cavity and the diffuser plenum, and a port in the hood fluidly coupling the diffuser plenum to the hood cavity; and a fuel injector assembly projecting longitudinally along a centerline through the port and into the hood cavity, the fuel injector assembly spaced from the hood at the port by an annular gap, and the fuel injector assembly including a fuel nozzle, a steam passage and a steam nozzle; the fuel nozzle arranged longitudinally along the centerline between the steam nozzle and the combustion chamber, and the fuel nozzle configured to direct fuel into the combustion chamber;

the steam passage for carrying steam arranged longitudinally along the centerline; and the steam nozzle arranged to receive the steam from the steam passage, the steam nozzle comprising a plurality of steam outlets arranged circumferentially about the centerline, and each of the plurality of steam outlets configured to direct a flow of the steam into the hood cavity radially outward away from the centerline, wherein the plurality of steam outlets are radially outward of the steam passage relative to the centerline.

17. The assembly of claim 16, each of the plurality of steam outlets is further configured to direct the flow of steam into a flow of air directed from the diffuser plenum into the hood cavity through the annular gap.

* * * * *